(12) United States Patent
Rosenblatt et al.

(10) Patent No.: US 12,403,785 B2
(45) Date of Patent: Sep. 2, 2025

(54) PRECOOLING OF ELECTRIC VEHICLE CHARGING STATIONS

(71) Applicant: Rivian IP Holdings, LLC, Plymouth, MI (US)

(72) Inventors: Michael Rosenblatt, Boulder, CO (US); Silva Hiti, Redondo Beach, CA (US)

(73) Assignee: Rivian IP Holdings, LLC

( * ) Notice: Subject to any disclaimer, the term of this patent is extended or adjusted under 35 U.S.C. 154(b) by 555 days.

(21) Appl. No.: 17/940,275

(22) Filed: Sep. 8, 2022

(65) Prior Publication Data

US 2024/0083276 A1    Mar. 14, 2024

(51) Int. Cl.
| | | |
|---|---|---|
| *B60L 53/302* | (2019.01) | |
| *B60L 53/62* | (2019.01) | |
| *B60L 53/66* | (2019.01) | |
| *B60L 58/12* | (2019.01) | |
| *H02J 7/00* | (2006.01) | |

(52) U.S. Cl.
CPC ............ *B60L 53/302* (2019.02); *B60L 53/62* (2019.02); *B60L 53/66* (2019.02); *B60L 58/12* (2019.02); *H02J 7/0048* (2020.01); *H02J 7/00712* (2020.01); *H02J 7/007194* (2020.01)

(58) Field of Classification Search
CPC ..................................................... B60L 53/302
USPC ........................................................ 320/109
See application file for complete search history.

(56) References Cited

U.S. PATENT DOCUMENTS

| | | | | |
|---|---|---|---|---|
| 10,286,807 | B2* | 5/2019 | Christen | H01M 10/63 |
| 2014/0012447 | A1* | 1/2014 | Gao | B60L 58/13 |
| | | | | 701/22 |
| 2016/0129797 | A1* | 5/2016 | Jackson | B60L 58/26 |
| | | | | 320/109 |
| 2020/0412160 | A1* | 12/2020 | Manzoor | B60L 50/60 |
| 2024/0326650 | A1* | 10/2024 | Shojaei | B60L 58/12 |

* cited by examiner

*Primary Examiner* — Jerry D Robbins
(74) *Attorney, Agent, or Firm* — FOLEY & LARDNER LLP

(57) ABSTRACT

Advance temperature control of charging station components is provided. A system can identify a first time at which an electric vehicle arrives at a charging station to charge the electric vehicle. The system can determine, based at least in part on the first time and a temperature of a component of the charging station, a second time prior to arrival of the electric vehicle at the charging station at which to activate a cooling system of the charging station. The system can provide an instruction to activate the cooling system at the second time to lower the temperature of the component of the charging station by the first time at which the electric vehicle arrives at the charging station to charge the electric vehicle.

20 Claims, 8 Drawing Sheets

600

PRECOOLING OF ELECTRIC VEHICLE CHARGING STATIONS

INTRODUCTION

Electric vehicles (EVs) can be powered using batteries that store energy. The EV batteries can be charged at charging stations.

SUMMARY

The present disclosure is generally directed to precooling of electric charging devices, such as EV charging stations. Regulating the temperature of charging devices can allow for their operation at an increased rate of charge and reduce the amount of time to charge an electric vehicle. The temperate of components of a charging station may increase due to a variety of factors, such as the exposure to sun, ambient temperature, or prolonged or recent use. It can be beneficial to precool the charging device to allow the charging device to maintain efficient delivery of power during a charging session. The present solution provides systems and methods for precooling or otherwise controlling the temperature of EV charging station components in anticipation of arrival of EVs seeking to use the EV charging station. For example, the present solution can identify a time at which an EV is scheduled to arrive at the charging station. Based on this time and the temperature of the EV charging station components, the present solution can determine the time at which to activate the precooling of the EV charger components. In doing so, the present solution can allow for the charging station to be cooled by the time the EV arrives. By precooling the EV charger components prior to their use, this technical solution can increase the rate of charge delivered by the charging session while reducing the charge time without wasting energy, such as on idle precooling.

At least one aspect is directed to a system. The system can include one or more processors, coupled with memory. The one or more processors can identify a first time at which an electric vehicle arrives at a charging station to charge the electric vehicle. The one or more processors can determine, based at least in part on the first time and a temperature of a component of the charging station, a second time. The second time can be a time that is prior to arrival of the electric vehicle at the charging station at which to activate a cooling system of the charging station. The one or more processors can provide an instruction to activate the cooling system at the second time to lower the temperature of the component of the charging station by the first time at which the electric vehicle arrives at the charging station to charge the electric vehicle.

At least one aspect is directed to a method. The method can include identifying, by one or more processors coupled with memory, a first time. The first time can be a time at which an electric vehicle arrives at a charging station to charge the electric vehicle. The method can include determining, by the one or more processors, based at least in part on the first time and a temperature of a component of the charging station, a second time. The second time can be a time prior to arrival of the electric vehicle at the charging station at which to activate a cooling system of the charging station. The method can include providing, by the one or more processors, an instruction to activate the cooling system at the second time to lower the temperature of the component of the charging station by the first time at which the electric vehicle arrives at the charging station to charge the electric vehicle.

At least one aspect is directed to an electric vehicle charger. The electric vehicle charger can include one or more processors, coupled with memory. The one or more processors can receive, via a network, an indication from an electric vehicle to establish a session to charge the electric vehicle. The indication can include a state of charge of a battery of the electric vehicle and a location of the electric vehicle. The one or more processors can select, based on the state of charge of the battery and the location of the electric vehicle, a charging station from a plurality of charging stations. The one or more processors can determine, responsive to the indication and based on a distance between the electric vehicle and the charging station, a first time at which the electric vehicle arrives at the charging station to charge the electric vehicle to begin the session. The one or more processors can determine, based at least in part on the first time and a temperature of a component of the charging station, a second time prior to arrival of the electric vehicle at the charging station at which to activate a cooling system of the charging station. The one or more processors can provide an instruction to activate the cooling system at the second time to lower the temperature of the component of the charging station by the first time at which the electric vehicle arrives at the charging station to charge the electric vehicle.

At least one aspect is directed to a system. The system can include one or more processors, coupled with memory. The one or more processors can access a model trained with machine learning and data comprising one or more of: values of temperature of one or more components of a charging station, values of an ambient temperature external to the charging station, metrics indicating performance of charging sessions of the charging station and a distance of an electric vehicle from the charging station. The one or more processors can identify, based on the model, a first time at which an electric vehicle arrives at a charging station to charge the electric vehicle. The one or more processors can determine, based on at least one of the first time and the temperature of the component input into the model, a second time prior to arrival of the electric vehicle at the charging station at which to activate a cooling system of the charging station. The one or more processors can provide an instruction to activate the cooling system at the second time to lower the temperature of the component of the charging station by the first time at which the electric vehicle arrives at the charging station to charge the electric vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of cooling (or otherwise regulating the temperature of) of electric vehicle charging stations. The various concepts introduced above and discussed in greater detail below may be implemented in any of numerous ways.

This disclosure is generally directed to a solution for regulating temperature of an EV charging station, such as by precooling or preheating an EV charging station in order to increase the charging station's rate of charge and reduce the amount of time taken to charge an electric vehicle. As EV charging stations charge electric vehicles, the temperature of the components of the charging station used to convey power can change. For example, the temperature of the power electronics within the charging station, or the power cable, can increase. To manage the temperature of components associated with the charging session, the charging station can reduce the rate of charge (e.g., the power) delivered to the electric vehicle. However, decreasing the rate at which the EV is being charged can extend the duration of the charging session. Cooling the components of the charging station to reduce their temperature while the charge session is ongoing can use more energy than maintaining the lower temperature of the same components when such components were cool at the start of the charging session.

This technical solution can provide precooling to EV charger components prior to the arrival of the EV to be charged at the charging station. The present solution can identify the time at which the EV is to arrive at the charging station. Based on this time and the temperature of the EV charger component, the present solution can determine the time to precool the EV charger components. The present solution can issue and send an instruction to commence the cooling of the EV charger component at the time to precool the EV charger component. By precooling the EV charger component, this technical solution can increase the rate of charge delivered by the charging session, thereby reducing the duration of the charging session in an efficient manner without wasting energy on idle precooling. In the instances in which EV charger is deployed in a very cold environment, the present solution can preheat the EV charging station or its components in order to prepare for the arrival of the EV to be charged.

Figure 1:
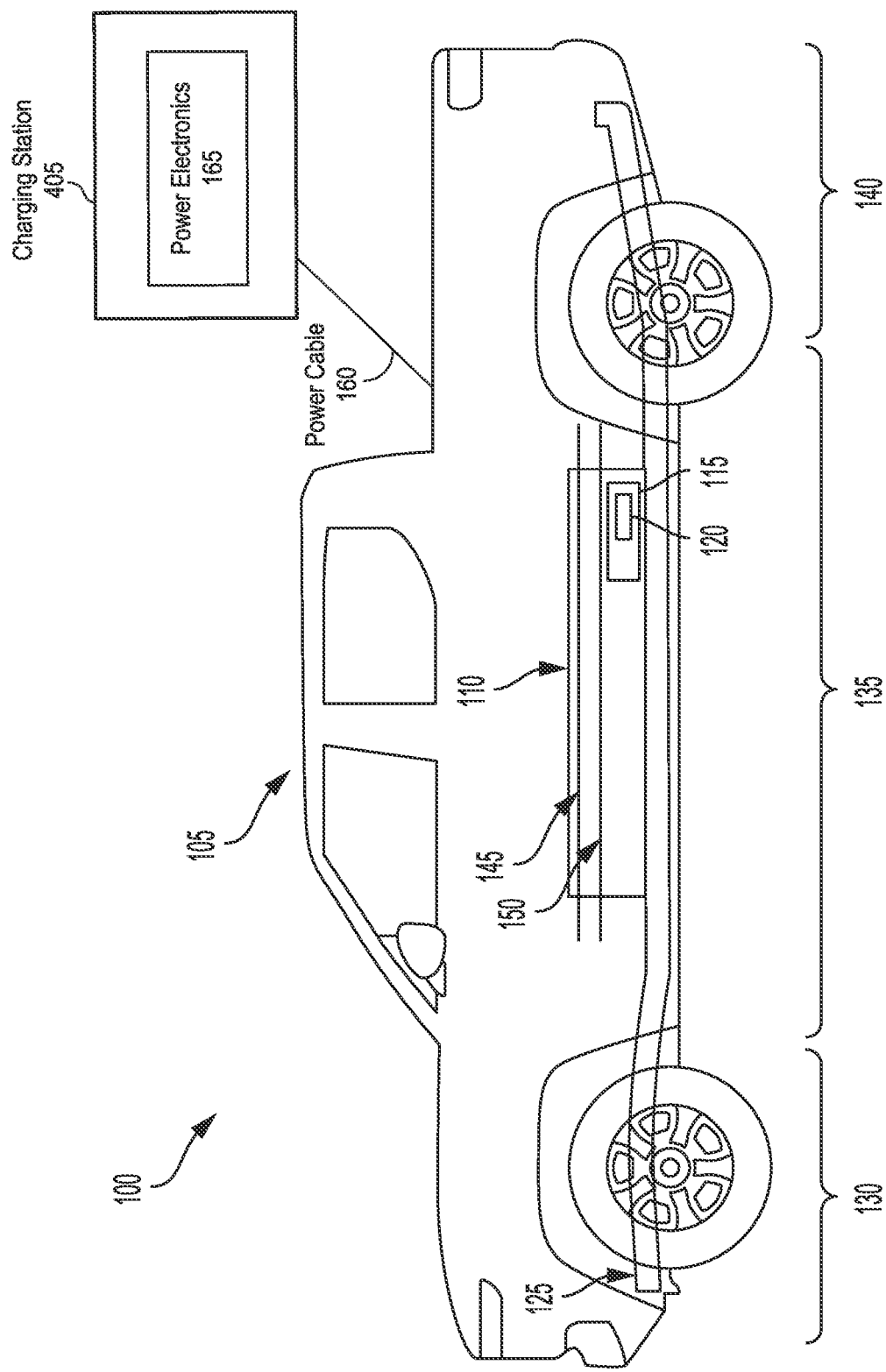
FIG. 1 depicts an example electric vehicle connected to a charging station.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
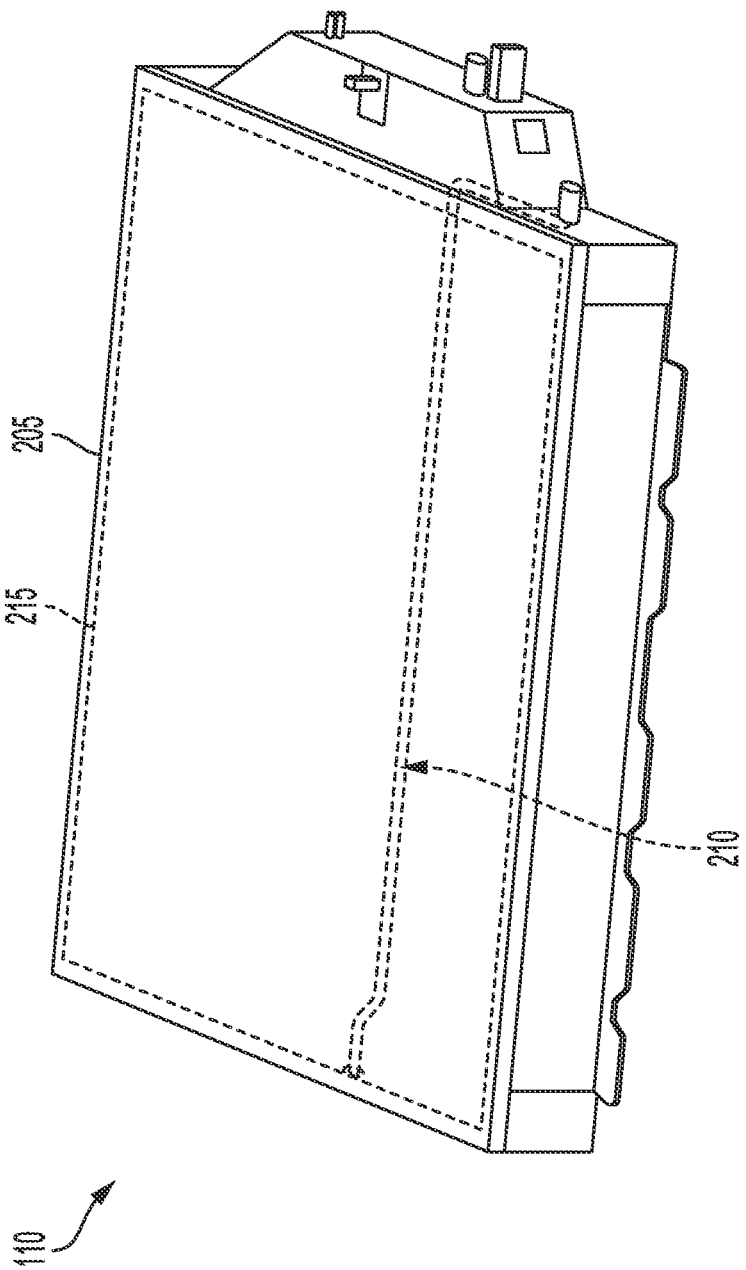
FIG. 2A depicts an example of one or more battery packs.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom or underneath the battery module 115 to protect the battery module 115 from external conditions, particularly if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. In some instances, the thermal component 215 may be positioned in relation to a top submodule and a bottom submodule, such as in between the top and bottom submodules, among other possibilities. The battery pack 110 can include any number of thermal components 215. For example, there can be one or more thermal components per battery pack 110, or per battery module 115. The fluid (e.g., cooling) line 210 can be coupled with, part of, or independent from the thermal component 215.

Figure 2B:
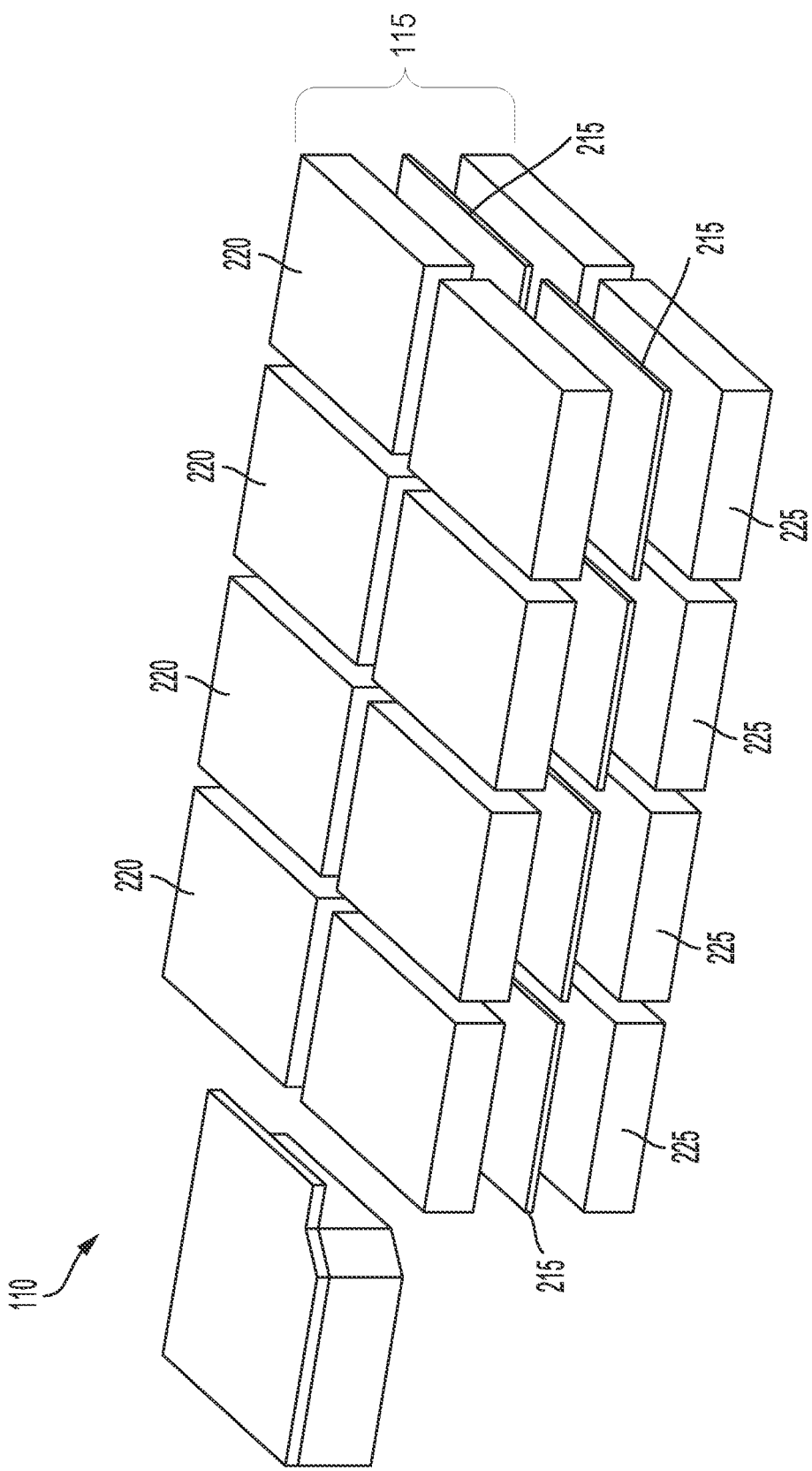
FIG. 2B depicts an example of one or more battery modules.
Figure 2C:
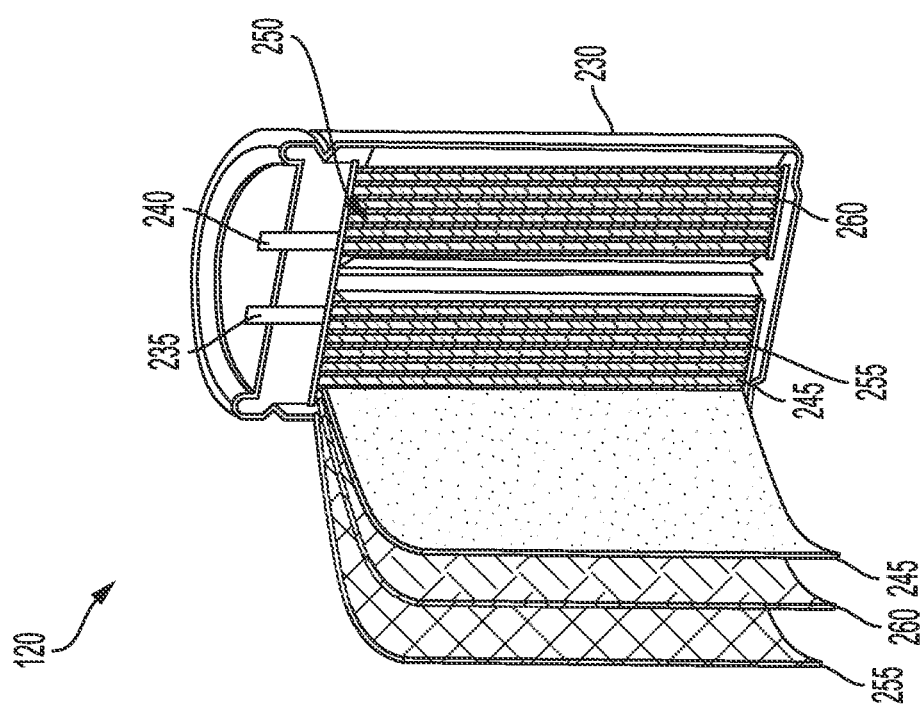
FIG. 2C depicts a cross sectional view of an example of a battery cell.

FIG. 2B depicts example battery modules 115, and FIG. 2C depicts an example cross sectional view of a battery cell 120. The battery modules 115 can include at least one submodule. For example, the battery modules 115 can include at least one top submodule 220 or at least one bottom submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical, prismatic, or pouch cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a cold plate 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, or prismatic form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 230 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

The battery cell 120 can include a lithium-ion battery cell, for example. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 can include at least one anode layer 245, which can be disposed within the cavity 250 defined by the housing 230. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated).

The battery cell 120 can include at least one cathode layer 255 (e.g., a composite cathode layer compound cathode layer, a compound cathode, a composite cathode, or a cathode). The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can transfer ions between the anode layer 245 and the cathode layer 255. The electrolyte layer 260 can transfer cations from the anode layer 245 to the cathode layer 255 during the operation of the battery cell 120. The electrolyte layer 260 can transfer anions (e.g., lithium ions) from the cathode layer 255 to the anode layer 245 during the operation of the battery cell 120.

The electrolyte layer 260 can include or be made of a liquid electrolyte material. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof. The ceramic electrolyte material for the electrolyte layer 260 can include, for example, lithium phosphorous oxy-nitride ($Li_xPO_yN_z$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), among others. The polymer electrolyte material (e.g., a hybrid or pseudo-solid state electrolyte) for electrolyte layer 260 can include, for example, polyacrylonitrile (PAN), polyethylene oxide (PEO), polymethyl-methacrylate (PMMA), and polyvinylidene fluoride (PVDF), among others. The glassy electrolyte material for the electrolyte layer 260 can include, for example, lithium sulfide-phosphor pentasulfide ($Li_2S$—$P_2S_5$), lithium sulfide-boron sulfide ($Li_2S$—$B_2S_3$), and Tin sulfide-phosphor pentasulfide ($SnS$—$P_2S_5$), among others.

Figure 3:
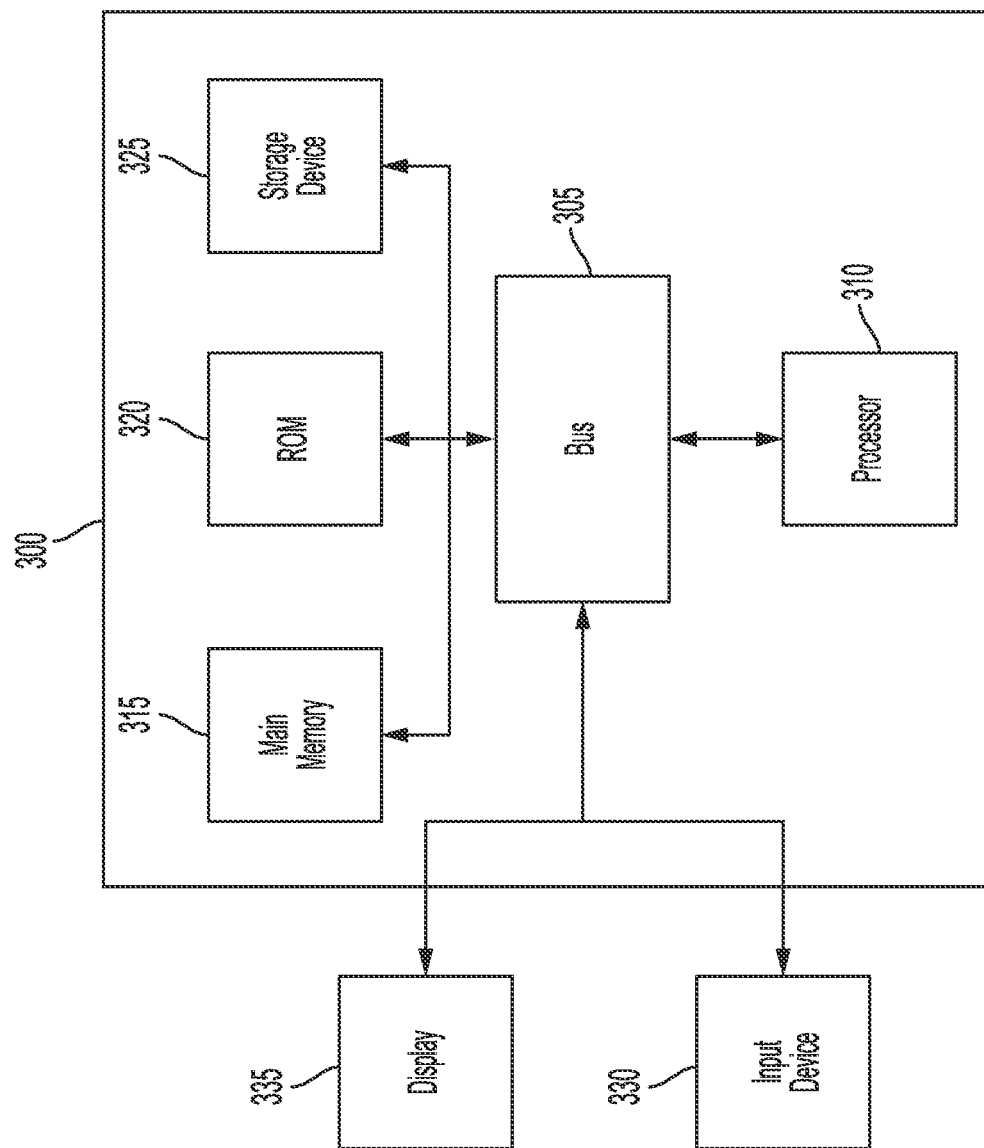
FIG. 3 is a block diagram illustrating an example architecture for a computer system that can be employed to implement elements of the systems and methods described and illustrated herein.

FIG. 3 depicts an example block diagram of an example computer system 300. The computer system or computing device 300 can include or be used to implement a data processing system or its components. The computing system 300 includes at least one bus 305 or other communication component for communicating information and at least one processor 310 or processing circuit coupled to the bus 305 for processing information. The computing system 300 can also include one or more processors 310 or processing circuits coupled to the bus for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 may be coupled via the bus 305 to a display 335, such as a liquid crystal display, or active matrix display, for displaying information to a user such as a driver of the electric vehicle 105 or other end user. An input device 330, such as a keyboard or voice interface may be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
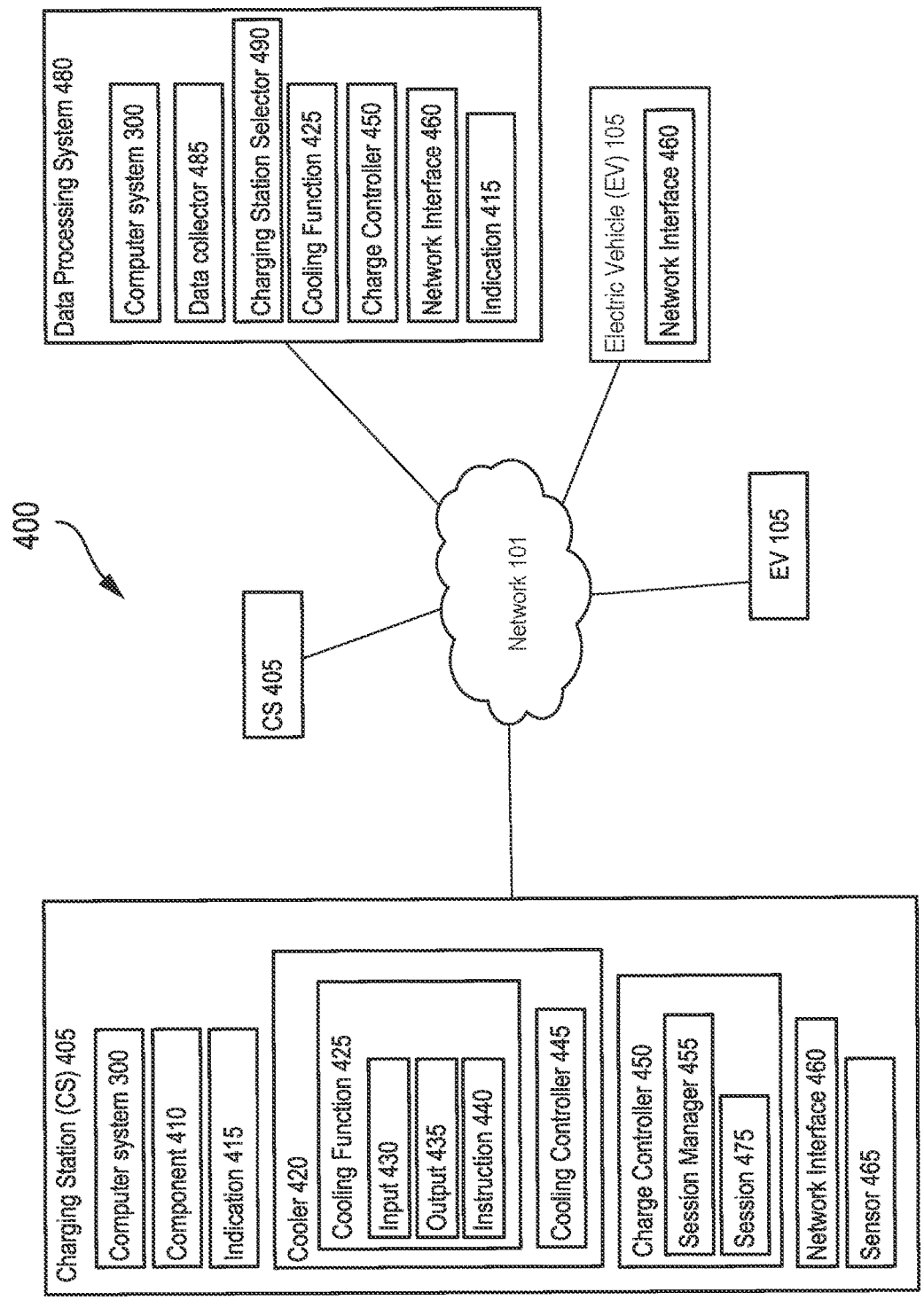
FIG. 4 is a block diagram illustrating an example of a system to precool an EV charging station.

FIG. 4 illustrates an example system 400 of the present solution for temperature control or regulation (e.g., precooling) of an EV charging station in anticipation of an EV set to arrive to the charging station. As shown in FIG. 4, one or more charging stations (CS) 405 can be deployed at one or more locations. Charging stations 405 can communicate with one or more EVs 105 via one or more networks 101. Each charging station 405 can include one or more computer systems 300, one or more components 410, such as charging cables 160 or power electronics 165, which can be used to charge an EV 105. Charging station 405 can include one or more charge controllers 450 that can include one or more session managers 455 to manage one or more sessions 475. Components 410 of the CS 405 can be used for charging EVs 105 and can be cooled by one or more coolers 420. Cooler 420 can include a heater that can be used for regulating temperature. For example, cooler 420 can include an electrical heating component or a heating device that can raise the temperature of one or more components 410 in order to place the component 410 at desired or target temperature range. The desired or target temperature range can be a temperature range that allows performance of the EV charging station 405 at a particular power level. For example, if an EV charging station 405 is deployed in very cold environment, the temperate can be raised in order to reach a temperature range that allows for charging of EV 105 at a highest power level. In such instances, DPS 480 can activate a heater or a heating unit in a cooler 420 to increase the temperature of the component 410 and place the EV charging station 405 at a desired target level.

Each cooler 420 can include one or more cooling controller 445 and one or more temperature control (e.g., cooling) functions 425. Each cooling function 425 can include one or more inputs 430, one or more outputs 435 and one or more instructions 440. Cooling controller 445 can control temperature regulation of EV charging station 405 or its components 410, including precooling or preheating components 410. CS 405 can include one or more network interfaces 460 and one or more sensors 465. CS 405 can communicate with a data processing system 480, via network 101. Data processing system (DPS) 480 can include one or more computer systems 300, cooling functions 425, charge controllers 450, network interfaces 460 and indications 415. Across the network 101, each EV 105 can include one or more network interfaces 460 for communicating with the charging stations 405. System 400 can utilize one or more CSs 405 or one or more servers 480 to precool or preheat components 410 used for charging EVs 105 prior to the arrival of the EV 105 to the CS 405 location or site, based on a time when the EV 105 arrives at the CS 405 and the temperature of component 410.

A charging station 405 can include any combination of hardware and software for providing electricity or otherwise electrically charging one or more batteries of one or more EVs 105. CS 405 can be a bidirectional charging station and can include any combination of hardware and software for providing and drawing power or energy or otherwise charging and discharging one or more batteries of the EV 105, including battery packs 110, battery modules 115 or battery cells 120. CS 405 can include scripts, functions and computer code stored in memory and executed or operating on one or more processors to implement any functionality of the CS 405. CS 405 can include a computer system 300, including one or more processors 310 and memories 315, 320 and 325, each of which can store computer code, scripts, functions and instructions to implement any functionality of CS 405. CS 405 can include electrical and power circuitry, control logic or circuits, power electronics, power supply circuitry, energy storage devices, such as batteries, and other hardware for storing, controlling, modulating or otherwise managing power, energy or electricity provided to, or drawn from, EVs 105. CS 405 can include electric vehicle charging equipment that can include a power and control box and power cord or a cable. CS 405 can include circuitry for converting alternating current (AC) to direct current (DC), such as an AC-DC converter. CS 405 can include DC-AC converters or DC-DC converters.

Charging station 405 can include one or more bidirectional chargers which can be electrically coupled to an electrical grid. The CS 405 can draw electricity from the grid to charge EVs 105 and can receive electricity from the batteries (e.g., 110, 115 or 120) of the EV 105 and provide this electricity to the electrical grid. Charging station 405 can include or configure any level of EV charging equipment, such as level-1, level-2, level-3 or any other charging equipment level known or used in the industry. Charging station 405 can be set to operate, including provide or draw electricity, at any voltage, current or power level. For example, CS 405 can provide electricity to EVs or draw power from EVs 105 at any voltage level, such as 120V, 208-240V or 400-900V. Similarly, CS 405 can provide electricity to EVs 105 or draw electricity from EVs 105 at any power levels, such as anywhere between 5 and 800 kW, such as 5 kW, 10 kW, 20 kW, 30 kW, 50 kW, 80 kW, 100 kW, 150 kW, 220 kW, 250 kW, 300 kW, 350 kW, 500 kW, or more. Higher power throughput by CS 405 can result in increased thermal energy dissipation and increase the temperature of some of the components of the CS 405. As the temperature of a component increases, the CS 405 can decrease the power output or charge rate to or from the EV 105 to maintain the temperature of the component at or below an established thermal threshold or recommended level for the component 410. Charging station 405 can utilize coolers 420 to cool down components of the CS 405 and maintain the power, voltage or current throughput at a higher level while satisfying the thermal threshold for the component 410.

Components 410 of the CS 405 can include any component, part, subsystem or system of the CS 405 generating thermal energy. Components 410 can include any one or more components of a charging station 405, such as a control box housing power circuitry or a power cord or a cable for charging the EV 105. Components 410 can include power electronics 165 which can include any circuitry, including for example, AC-DC converters, DC-DC converters, DC-AC converters, any combination of power transistors, capacitors, inductors, resistors, diodes, switches, transformers, relays and other electrical or electronic components to form structures, such as half and full bridge circuits, rectifiers, filters, multi-function circuits, single or multi-stage chargers with resonant half-bridge converts utilizing one or more inductors and one or more capacitors, such as the LLC converters and single or multi-directional DC-DC converters. Components 410 can include memory, such as 315, 320 or 325 memories, that can store scripts, computer code or instructions to be accessed or executed by electronic microcontrollers or devices, such as processors 310. Components 410 can include one or more energy storage systems, including batteries. Components 410 can include lithium-ion, solid-state or any other type and form of battery type.

Component 410 can include a power cable 160, which can also be referred to as the power cord 160. Power cable or cord 160 can be attached to or coupled with power electronics 165 and cooled by a cooler 420 device. The power cable 160 can include one or more electrical conductor wires or lines, including lines or wires for high power throughput as well as electronic or electrical signals. Component 410 can include a power plug for plugging into an EV 105. Component 410 can include wires or lines for conducting high power, high voltage or high current between EV 105 and CS 405. Component 410 can include one or more wires or lines for conducting analog or digital communication signals between the EV 105 and CS 405. Component 410 can include communication circuitry, such as processors or microcontrollers for receiving, sending and processing communication via the wires or lines. Component 410 can include a threshold, such as a threshold temperature for which the component 410 is rated.

Indications 415 can include any type and form of data, information or notification that can be used for cooling or precooling of CS 405 or its components 410. Indication 415 can be information or data used for making determinations or decisions with respect to the precooling of charging station 405 components 410. Indication 415 can be any information received via a network interface 460, any information determined by CS 405 or its components 410 or any information measured by or received from sensors 465. Indication 415 can include any data or information about CS 405, environment of the CS 405, or the environment of EV 105.

Indication 415 can include, for example, an amount of power to be provided to the EV 105, an amount of power to be drawn from the EV 105, information about a temperature of a component 410 or a EV 105, including, e.g., temperature of an EV battery 110. Indication 415 can include information or indication of a temperature of a component 410, which can be received over a network 101 via network interface 460 or be measured from a sensor 465 and provided to the CS 405. For example, indication 415 can include temperature measurements of a power plug, power cord or cable, power electronics, specific electrical circuits of one or more power supplies, converters or transformers, or a temperature of control box of CS 405. Indication 415 can include a temperature of the ambient or surrounding environment in which the CS 405 is located or deployed. Indication 415 can include a temperature threshold for a particular component 410, such as a maximum rated temperature for a component 410.

Indication 415 can include information about an EV 105. For example, indication 415 can include information about the location of the EV 105, such as global positioning system (GPS) location, an address at which the EV 105 is located or a distance of the EV 105 from the CS 405. Indication 415 can include speed or velocity of the EV 105. Indication 415 can include estimate of average speed EV 105 will travel to CS 405. Indication 415 can include amount of power that EV 105 needs to receive from CS 405 or that an EV 105 needs to provide to CS 405. Indication 415 can include a state of charge of a battery pack 110 of EV 105.

Indication 415 can include a request received over a network 101 to book or reserve a CS 405 for an arriving EV 105. Indication 415 can include an indication or a request to establish a connection or a session 475 with CS 405. Indication 415 can identify a driver of an EV 105 or the EV 105 itself. Indication 415 can include information about an account of the driver of EV 105, such as a payment account for the driver to pay for the EV 105 charging station services. Indication 415 can include information about the temperature of the battery of the EV 105, rate of charge EV 105 requests and/or information about duration of time during which EV 105 is going to be connected to the CS 405 to complete its charging.

Coolers 420 can include any thermal management system for cooling CS 405 or its components 410. Cooler 420 can include any one or more devices or systems for dissipating thermal energy, such as electrical cooling systems, air cooling systems or water cooling systems. Cooler 420 can include a water cooling loop or loops that can flow through a path to take the heat from components 410 and deliver the heat to the heat exchanger unit that takes the heat away from the water and sends the cooled water back into the loop to continue looping and removing thermal energy. Cooler 420 can include any combination of lines or pipes for conducting or flowing liquid coolant, one or more fluid pumps, heat exchangers, cold plates, air or water fans, heat sinks, active and passive cooling systems and structures, heat pipes, Peltier systems, radiators, natural or forced convection cooling devices, refrigerators or any other components that can be used for cooling any one or more components 410.

Cooler 420 can be thermally interfaced with any components 410 of CS 405 to be cooled. Cooler 420 can be in thermal contact or coupling with any one or more of components 410, such power cords or cables, power plugs, power electronics or circuits or control box of the CS 405. Cooler 420 can be in a thermal contact with any electrical, mechanical, electromechanical, electrochemical or other components or systems of a CS 405, including AC-DC converters, DC-DC converters, energy storage systems, transformers, processors, transistors, relays or any other components 410 used in a CS 405. Cooler 420 can be coupled to or operate on any one or more rates of cooling as determined by cooling functions 425.

Inputs 430 can include any information input into one or more cooling functions 425. Input 430 can include a reading or a determination, including a reading or a measurement from a sensor 465. Input 430 can include sensor 465 reading corresponding to temperature, pressure, vibration, light, or any other sensor 465 reading. Input 430 can include a temperature reading of a component 410, CS 405 ambient temperature, EV 105 or battery pack 110 of the EV 105. Input 430 can include time, such as time at which EV 105 is to arrive at the CS 405 or a location at which one or more CSs 405 are deployed. Input 430 can include any indication 415. Input 430 can include a distance between EV 105 and CS 405. Input 430 can include any data of a CS 405, such as the status of a CS 405, amount of energy stored at a battery of CS 405, health status of CS 405, metrics of sessions 475 or metrics performance data, rates of charge or discharge available to the CS 405, a rate of cooling at the CS 405, a notification concerning a reservation for an EV 105 to be charged at the CS 405. Input 430 can include an amount of power to charge to, or discharge from, the battery pack 110 of EV 105 or information about EV 105 or the driver of 105. Input 430 can include metrics of a session 475, such as metrics of the session 475 performance.

Outputs 435 can include any information determined by the cooling function 425 based one or more inputs 430 input into the cooling function 425. Output 435 can include the time at which to turn on one or more coolers 420. The one or more coolers can be for one or more components 410, such as power electronics control box or power cord or a cable. Output 435 can include the time at which the EV 105 is to arrive at the CS 405. Output 435 can include an amount of time that EV 105 is going to take to arrive at CS 405. Output 435 can include information to start a session 475 for an EV 105. Output 435 can include an amount of power to charge a battery pack 110 of EV 105. Output 435 can include an amount of power to draw from the battery pack 110 of EV 105. Output 435 can include a temperature, such as a temperature of one or more components 410 at which the rate of charge from CS 405 can increase to a predetermined rate of charge.

Cooling functions 425 can include any logic or functionality for management of precooling of components 410 of CS 405. Cooling function 425 can include any combination of hardware and software, including any scripts, functions and computer code stored in memory and executed or operating on one or more processors to implement any functionality of the cooling functions 425. Cooling function 425 can include functionality for determining timing and amount of cooling to be provided to different components 410. Cooling function 425 can include functionality for determining a rate of charge to provide to EV 105 or draw from EV 105, a rate of cooling to provide to a component 410, a temperature to which to cool a component 410, a temperature of a component 410 at which a particular rate of charge or discharge can be provided, a time when an EV 105 arrives to the CS 405, a duration of time that it takes for EV 105 to arrive at CS 405 or an amount of power to provide to EV 105 or draw from EV 105.

Cooling function 425 can include the functionality to determine the time of arrival of the EV 105. Cooling function 425 can utilize the EV's location from an indication 415 to determine the time at which the EV 105 is to arrive at the given CS 405. Cooling function 425 can utilize information about the speed of the EV 105 to determine the time of EV's arrival. Cooling function 425 can use traffic information or data to determine the time of EV's arrival.

Cooling function 425 can include functionality for determining any output 435 based on input 430. For example, cooling functionality 425 can determine the time at which to turn on, or activate, precooling of a component 410. Cooling function 425 can determine the rate of cooling of different coolers 420 are to be operated or which coolers 420 to activate and which not to activate. Cooling function 425 can determine to activate one or more coolers 420 at one or more times, at one or more cooling rates, while activating other coolers 420 at other rates of cooling. Cooling function 425 can determine temperature to which to reduce the temperature of one or more components 410 to cool by the cooler 420. Cooling function 425 can determine or predict the time at which the EV 105 is to arrive at CS 405 or time that it takes for the EV 105 to arrive. Cooling function 425 can determine the amount of cooling to provide based on the rate of charge. Cooling function can determine or establish a session for the EV 105.

Cooling function 425 can make determinations using a model, which can include a machine learning (ML) model or an artificial intelligence (AI) model. The model can make any determinations of outputs 435, based on inputs 430 that can be input into the model. The model can make determinations using, or based on, any type of ML technique, including, for example, supervised learning, unsupervised learning or reinforcement learning. The model can use or include functions such as linear regression, logistic regression, a decision tree, support vector machine, Naïve Bayes, k-nearest neighbor, k-means, random forest, dimensionality reduction function, or gradient boosting functions. Cooling function 425 can include any functionality for training an ML or AI model of cooling function 425.

Cooling functions 425 can issue instructions 440. For example, the cooling controller 445 can execute a cooling function 425 to generate and issue an instruction 440. Instructions 440 can include any instructions based on output 435. Instructions 440 can include any instructions implementing output of 435. For example, instruction 440 can be an instruction to turn on a cooler 420, such as a cooling loop for a particular component 410. For example, instruction 440 can include an instruction to activate a cooling loop for a power cable or a power cord that plugs into EV 105. Instruction 440 can include an instruction to activate a cooling loop for a power electronics box or module that includes circuitry managing power delivered to EV 105 or drawn from EV 105. Instruction 440 can include an instruction to set a rate of cooling, a rate of charge, a temperature to which to cool a component 410, a time at which to activate a cooler 420, which cooler 420 to activate or to establish a session for EV 105.

Cooling controllers 445 can include any combination of hardware and software for controlling coolers 420, including valves, relays and control circuits activating, deactivating and controlling rate of cooling by coolers 420. Cooling controller 445 can include scripts, functions and computer code stored in memory and executed or operating on one or more processors to implement any functionality of the cooling controller 445. Cooling controller 445 can include control circuitry or devices for activating and deactivating coolers 420, including cooling loops for particular components 410, setting or controlling a rate of cooling by a cooler 420 or maintaining cooling of a component 410 until temperature of that component 410 meets or exceeds a threshold temperature.

Charge controllers 450 can include any combination of hardware and software for controlling or managing charge or amount of power provided to EV 105. Charge controller 450 can include scripts, functions and computer code stored in memory and executed or operating on one or more processors to implement any functionality of the charge controller 450. Charge controller 450 can set and control a rate of charge to provide to EV 105 or a rate of charge to draw from an EV 105. Charge controller 450 can set a power level, a voltage level or a current level for an EV charge, in either direction. Charge controller 450 can set up and maintain sessions 475 using session managers 455. Charge controller 450 can maintain a rate of charge via a power cable between the CS 405 and EV 105 based on temperature of CS 405, such as temperature of component 410, such as a power or charging cable or power electronics box or circuit. Charge controller 450 can set, establish or maintain a rate of charge based on a temperature threshold for a component 410, such as for example maximum rated temperature for the component 410. Charge controller 450 can set, establish or maintain a rate of charge based on a temperature or a temperature range at which the component 410 can output at a higher power range. For example, charge controller 450 can increase the rate of charge at a higher power level, based on the temperature of a component 410 (e.g., power cable or power electronics box) reaching or exceeding below a threshold temperature for that component 410 and at that rate of charge.

Session managers 455 can include any combination of hardware and software for managing sessions 475. Session manager 455 can include scripts, functions and computer code stored in memory and executed or operating on one or more processors to implement any functionality of the session manager 455. Session manager 455 can establish a connection and/or session with an EV 105. Session manager 455 can communicate with EV 105 to set, establish, monitor or maintain the session 475, including the power received from or delivered to EV 105, rate of charge to and from EV 105, temperature of the EV battery 110, state of charge or state of health of EV battery 110, temperature of components 410 corresponding to the session 475 for the particular EV 105 as well as any settings or configurations for the particular session 475, such as the timing for activating cooler 420 for the CS 405 that corresponds to the session 475 and/or EV 105, the rate of cooling or rate of charge.

Sessions 475 can include any sessions of the CS 405 for providing charge to or from EV 105. Session 475 can include a session with any number of EVs 105. Session 475 can include a session with a particular EV 105, such as an EV 105 from which CS 405 has received an indication 415. Session 475 can be established to set up any configurations for the interaction of the CS 405 with EV 105, such as establishing, setting and/or implementing the timing of precooling (e.g., activating one or more coolers 420), amount of cooling to provide, the component 410 to cool, the particular cooler 420 to activate, the rate of cooling to provide, the amount of charge to provide or receive, the rate of charge or a temperature to achieve per cooling and/or charging operation. Session 475 can include any inputs 430, outputs 435 and instructions 440 for a particular EV 105. Session 475 can include or process EV 105 driver's account or information, such as a payment processing account or information. Session 475 can include metrics Network interfaces 460 can include any combination of hardware and software for communicating via a network 101. Network interface 460 can include scripts, functions and computer code stored in memory and executed or operating on one or more processors to implement any functionality of the network interface 460. Network interface 460 can include functionality for communicating via network 101 using any network communication protocol such as Transmission Control Protocol (TCP)/Internet Protocol (IP), user datagram protocol (UDP), or any other communication protocol used for communicating over a network 101. Network interface 460 can include network communication ports and hardware for receiving and sending communications over the network 101.

Sensors 465 can include any device that detects or measures physical properties of either a CS 405 or an EV 105. Sensor 465 can include a temperature sensor, such as a thermocouple, resistance temperature detector (RTD), thermistor, or semiconductor based integrated circuit for measuring temperature. Sensor 465 can include a voltage, power or resistance sensor, device or a circuit. Sensor 465 can include a pressure sensor, vibration sensor, proximity sensor, velocity sensor, accelerometer, light sensor, smoke sensor, gas sensor, infra-red sensor, water flow sensor, humidity sensor, or any other type of sensor or detector.

Data processing system (DPS) 480 can include any combination of hardware and software for processing information or data concerning cooling of EVs 105 and communicating information with the CS 405 and EVs 105 over the network 101. DPS 480 can comprise the functionality for managing cooling operations of one or more remote CSs 405, including performing any functionality of cooling functions 425 and charge controllers 450 on behalf of any remote charging stations 405. Data processing system 480 can operate on a remote server, a server farm, a virtual machine or a cloud computing system comprising one or more servers or located at a data center. DPS 480 can include or be coupled to a computer system 300, which can include one or more processors 310 that can be coupled with memory (e.g., 315, 320, 325), each of which can store computer code, scripts, functions and instructions to implement any functionality of the DPS 480 or the CS 405. DPS 480 can include scripts, functions and computer code stored in memory and executed or operating on one or more processors perform processing related to precooling of an EV 105 on a CS 405. For example, DPS 480 can have access to or include one or more cooling functions 425, charge controllers 450 and indications 415. DPS 480 can perform the functionalities of the cooling functions 425 and charge controllers 450 remotely and receive inputs 430 from the CS 405 and communicate instructions 440 to the CS 405. DPS 480 can perform all determinations corresponding to precooling and cooling control that can be performed by CS 405.

Data collector 485 can include any combination of hardware and software for collecting and storing all data from various charging stations 405 and various EVs 105. Data collector 485 can be designed, constructed and operational to receive data, such as in a real-time data stream, a data feed, a batch upload, or responsive to a request, query or poll for data. Data collector 485 can receive and store data or information, such as indications 415 from EVs 105 or CSs 405. Data collector 485 can receive and store inputs 430, outputs 435 and instructions 440. Data collector 485 can include a database with data structures for one or more or each CS 405 and one or more or each EV 105. Data collector 485 can provide data to the DPS 480 for processing, to allow for the DPS 480 to operate on the inputs 430 and indications 415 and provide outputs 435 and instructions 440 to the remote CSs 405.

Charging station selector 490 can include any combination of hardware and software for selecting CSs 405 for an EV 105. Charging station selector 490 can include the functionality of identifying which CSs 405 are most suitable to service an EV 105. For example, charging station selector 490 can include the functionality to determine locations of closest CSs 405 for an EV 105, based on an indication of EV 105, such as EV's location. Charging station selector 490 can select for the EV 105 the closest EV 105. Charging station selector 490 can include the functionality to determine which CS 405 is available and then select for an EV 105 the closest available CS 405. Charging station 405 can include the functionality to determine which CS 405 has components 410 whose temperature is below a threshold (e.g., sufficiently cooled) and can select for the EV 105 the closest CS 405 whose components 410 are sufficiently precooled. For example, if a first charging station 405 and a second charging station 405 are both located the same distance from an EV 105 and both the first and second charging stations are available to charge the EV 105, the charging station selector 490 can select the charging station having components 410 that are cooler (e.g., have lower temperature). For example, the first charging station 405 may be 5% cooler than the second charging station 405, in which case the charging station selector 490 can select the first charging station 405. The data processing system 480 can provide an instructions or other indication to the EV 105 to direct and cause the EV 105 to arrive at the first charging station 405. In some cases, the charging station selector 490 can instruct the first charging station 405 to display a visual indication (e.g., a light, color, text, or image), or an auditory indication (e.g., an alarm, beep, or other sound) to cause the EV 105 to arrive at the selected CS 405. The charging station selector 490 can be configured with one or more selection techniques, policies, heuristics, or rules to select charging stations 405 for EVs 105.

The present solution can include a system that can be coupled to or include one or more processors 310 that can be coupled with memory (e.g., 315, 320, 325). The one or more processors can be operating on a data processing system 480 or on a charging station 405. The one or more processors 310 can identify a first time (e.g., 430) at which an electric vehicle 105 arrives at a charging station 405 to charge the electric vehicle 105. The one or more processors 310 can determine, based on any one or more inputs 430 input into cooling functions 425, one or more outputs 435. For example, the one or more processors can determine, based at least in part on the first time (e.g., 430) and a temperature of a component (e.g., 430) of the charging station 405, a second time (e.g., 435) prior to arrival of the electric vehicle 105 at the charging station 405, at which to activate a cooling system (e.g., 420) of the charging station (e.g., 405). The one or more processors 310 can issue or provide one or more instructions 440 to activate a cooling system 420. For example, the one or more processors (e.g., 310) can provide an instruction (440) to activate the cooling system (420) at the second time (435) to lower the temperature of the component (410) of the charging station by the first time at which the electric vehicle 105 arrives at the charging station 405 to charge the electric vehicle 105.

The one or more processors 310 can receive, via a network 101, an indication 415 from the electric vehicle 105 to establish a session 475 to charge the electric vehicle 105. The one or more processors 310 can determine, responsive to the indication 415 and based on a distance between the electric vehicle and the charging station (e.g., 430), the first time (e.g., 435) at which the electric vehicle arrives at the charging station to begin the session. The one or more processors 310 can receive, via a network 101, an indication 415 of a location (e.g., 430) of the electric vehicle 105. The one or more processors 310 can select, based on the location (e.g., 430), the charging station 405 from a plurality of charging stations 405. For example, a cooling function 425 can utilize an artificial intelligence model to determine an estimated time of arrival for the EV 105. This determination can be made, by a DPS 480, based on one or more indications 415, which can indicate EV's location, the location of the CS 405, the speed at which the EV 105 is traveling, the current traffic conditions, the weather conditions and any other data that can be used to determine the most likely time it will take for the EV 105 to arrive at a given CS 405. The one or more processors 310 can establish, based on a distance (e.g., 430) between the selected charging station 405 and the electric vehicle 105, a session 475 to begin to charge the electric vehicle 105 at the first time (e.g., 430).

The one or more processors 310 can receive, via a sensor 465, an indication 415 of a first value of the temperature (e.g., 430) of the component 410. The component 410 can include at least one of a power cable (e.g., power cable 160 depicted in FIG. 1) or power electronics (e.g., power electronics 165 depicted in FIG. 1). The one or more processors 310 can compare the first value (e.g., 430) with a threshold established for the component 410. For example, the first value can correspond to the temperature of the power cable 160 or power electronics 165 in the CS 405. The power cable 160 or power electronics 165 can each have their own rated threshold temperature. The one or more processors 310 can compare the first value of the temperature against the rate threshold temperature for the component 410. Each of the components 410, such as the power cable 160 or power electronics 165, can have different threshold temperatures for operating at different power levels. For example, there can be a temperature threshold for operating a components 410 at a higher power level, which can be different from a threshold temperature when the component is operated at a lower power level.

The one or more processors 310 can determine, based at least in part on a comparison of the first value (e.g., 430) with the threshold, such as the rated temperature threshold or the power level threshold, to activate the cooling system (e.g., 420) at the second time (e.g., 435). The one or more processors 315 can determine the second time in response to determining that cooling the component to a particular threshold is going to take additional time. The one or more processors 310 can receive, via a sensor 465, an indication 415 of an ambient temperature (e.g., 430) that is external to the charging station 405. The one or more processors 310 can determine, based at least in part on the first time (e.g., 430), the temperature (e.g., 430) of the component 410, and the ambient temperature (e.g., 430) external to the charging station 405, to activate the cooling system 420 at the second time (e.g., 435).

The one or more processors 310 can receive, from the electric vehicle 105 via a network 101, an indication (e.g., 415, 430) of a state of charge of a battery (e.g., 110, 115, 120) of the electric vehicle 105 and a location of the electric vehicle (e.g., 430). The one or more processors 310 can select, based on the state of charge of the battery and the location of the electric vehicle, the charging station 405 from a plurality of charging stations 405. For example, a data processing system 480 can utilize the charging station selector 490 to select the charging station 405, based on the input from the EV 105 identifying the state of battery charge and location of the EV. The one or more processors 310 can predict, based on a distance (e.g., 430, 435) between the selected charging station 405 and the electric vehicle 105, the first time (e.g. 435) at which the electric vehicle 105 arrives at the charging station 405. For example, the data processing system 480 can identify from its data collector 485 charging stations 405 in the area in which EV 105 is seeking to charge its battery. Upon selecting the charging station 405 that is available to the EV 105, the data processing system 480 can use the distance between the EV 105 and the selected CS 405 to determine the time of EV's arrival to the CS 405. DPS 480 can make the determination of the time of arrival based on the traffic data, weather data as well as road conditions the EV is expected to travel to the CS 405.

The one or more processors 310 can receive, from the electric vehicle 105 via a network 101, an indication 415 of a state of charge of a battery (e.g., 110, 115) of the electric vehicle 105. The one or more processors 310 can determine, based on the state of charge, an amount of power to charge (e.g., 435) the battery (e.g., 110, 115, 120) of the electric vehicle 105 and establish, based on the amount of power to charge the battery, to activate the cooling system 420 at the second time (e.g., 435). The one or more processors 310 can receive a first value (e.g., 415, 430) of the temperature of the component 410 measured via a sensor 465. The one or more processors 310 can determine, based on the amount of power to charge the battery (e.g., 110, 115, 120), a second value (e.g., 435) of the temperature for the component 410 less than the first value (e.g., 435) that increases a rate of charge of the charging station 405 relative to the first value of the temperature. The one or more components 310 can determine the second time (e.g., 435) at which to activate the cooling system 420 based on the first value (e.g., 435) of the temperature, the second value (e.g., 435) of the temperature, and the first time of arrival (e.g., 430). Determination can be made by charge controller 450 using a session 475 of the EV 105 associated with the first time of arrival (e.g., 430).

The one or more processors 310 can establish a rate of cooling of the cooling system 420 based on the first value (e.g., 435) of the temperature, the second value (e.g., 435) of the temperature, and the first time of arrival (e.g., 430) and provide the instruction 440 to activate the cooling system 420 comprising an instruction to cool at the established rate of cooling. The one or more processors 310 can instruct the charging station 405 to present a notification at a third time (e.g., 435) that the charging station is reserved for the electric vehicle 105. The third time can be earlier than or equal to the second time (e.g., 435) at which the cooling system 420 is instructed to activate.

The one or more processors 310 can access a model (e.g., 425) trained with machine learning and data (e.g., 430) comprising values of the temperature of the component 410, values of an ambient temperature (e.g., 430) external to the charging station 405, and metrics (e.g., 430) indicating performance of charging sessions 475 of the charging station 405. The metrics indicating performance can include any collection of data corresponding to the sessions 475 at the charging station 405, such as rate of charge, power, current and voltage outputs, temperature readings and measurements, time to charge metrics, cooling rates and temperature measurements prior and post cooling, as well as any input 430 or output 435 data. The one or more processors 310 can determine, via the model (e.g., 425) and based on the first time (e.g., 430), the second time (e.g., 435) at which to activate the cooling system 420.

The one or more processors 310 can identify an amount of power (e.g., 430) to charge the electric vehicle 105, identify a first value (e.g., 430) of the temperature of the component measured by a sensor of the charging station and identify an ambient temperature (e.g., 430) external to the charging station 405. The one or more processors 310 can determine, via the model (e.g., 425) and based on the amount of power (e.g., 430), a second value (e.g., 435) of the temperature of the component 410 configured to improve performance of charging relative to the first value (e.g., 430). The one or more processors 310 can determine the second time (e.g., 435) at which to activate the cooling system 420 and a rate of cooling of the cooling system 420 via the model (e.g., 425) and based on the first time (e.g., 430), the amount of power (e.g., 43), the first value (e.g., 430) of the temperature of the component, the second value (e.g., 435) of the temperature of the component 410, and the ambient temperature (e.g., 430).

In some aspects, system 400 relates to an electric vehicle charging station (e.g., 405) that can include one or more processors 310 coupled with memory (e.g., 315, 320, 325). The one or more processors 310 can receive, via a network 101, an indication 415 from an electric vehicle 105 to establish a session 475 to charge the electric vehicle. The indication 415 can include a state of charge (e.g., 430) of a battery (e.g., 110, 115, 120) of the electric vehicle and a location (e.g., 430) of the electric vehicle 105. The one or more processors 310 can select, based on the state of charge of the battery and the location of the electric vehicle, a charging station 405 from a plurality of charging stations 405. The one or more processors 310 can determine, responsive to the indication 415 and based on a distance between the electric vehicle and the charging station, a first time (e.g., 435) at which the electric vehicle 105 arrives at the charging station 405 to charge the electric vehicle 105 in accordance with the session 475. The one or more processors 310 can determine, based at least in part on the first time (e.g., 435) and a temperature (e.g., 430) of a component 410 of the charging station 405, a second time (e.g., 435) prior to arrival of the electric vehicle 105 at the charging station 405 at which to activate a cooling system 420 of the charging station 405. The one or more processors 310 can provide an instruction 440 to activate the cooling system 420 at the second time to lower the temperature of the component 410 of the charging station 405 by the first time at which the electric vehicle 105 arrives at the charging station 405 to charge the electric vehicle 105.

In some aspects, the system 400 relates to a solution in which a system includes one or more processors coupled with memory. The one or more processors 310 can access a model (e.g., 425) trained with machine learning and data (e.g., 430) comprising one or more of: values of temperature of one or more components of a charging station, values of an ambient temperature external to the charging station, metrics indicating performance of charging sessions of the charging station and a distance of an electric vehicle from the charging station. The one or more processors 310 can identify, based on the model (e.g., 425), a first time (e.g., 435) at which an electric vehicle 105 arrives at a charging station 405 to charge the electric vehicle 105. The one or more processors 310 can determine, based on at least one of the first time (e.g., 430) and the temperature (e.g., 430) of the component 410 input into the model (e.g., 425), a second time (e.g., 435) prior to arrival of the electric vehicle 105 at the charging station 405 at which to activate a cooling system 420 of the charging station 405. The one or more processors 310 can provide an instruction 440 to activate the cooling system 420 at the second time to lower the temperature of the component 410 of the charging station 405 by the first time at which the electric vehicle 105 arrives at the charging station 405 to charge the electric vehicle 105.

Figure 5:
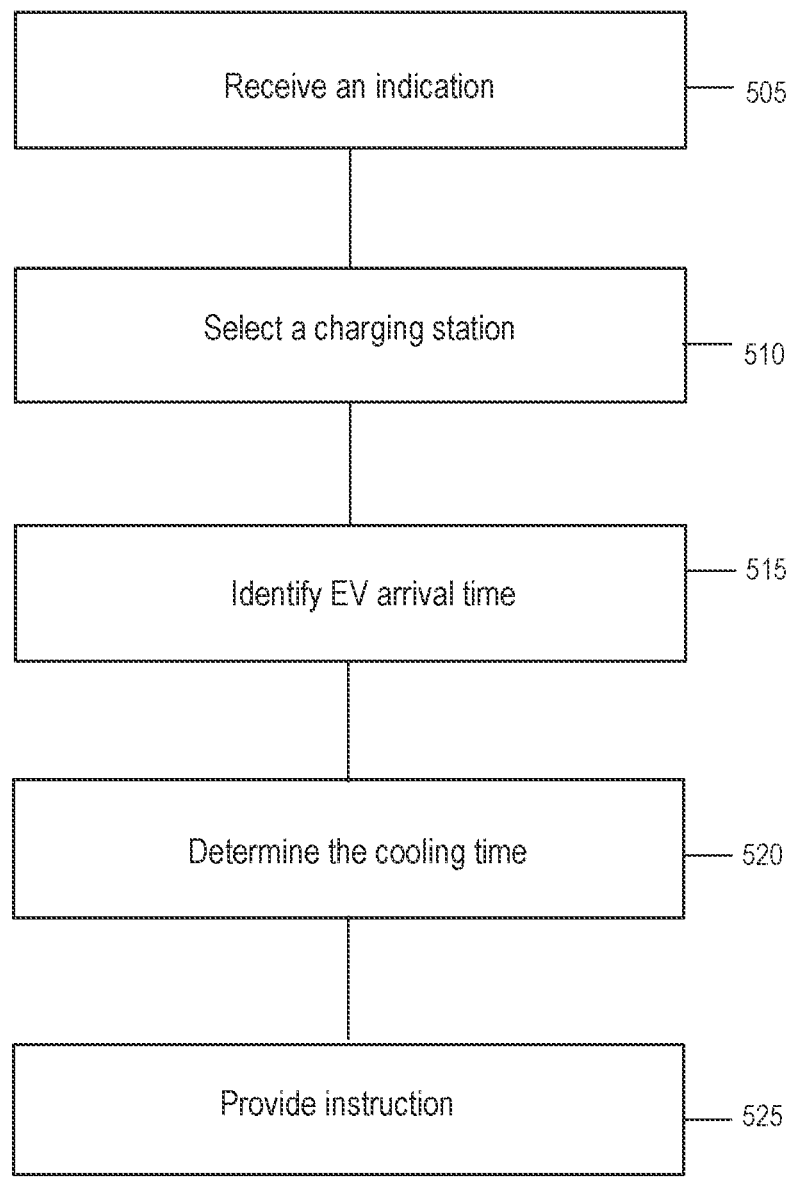
FIG. 5 is a flow diagram illustrating an example method for precooling an EV charging station.

FIG. 5 illustrates a method 500 to precool one or more charging stations 405. The method 500 can be performed by one or more systems or components depicted in FIG. 1, FIG. 3 or FIG. 4, including, for example, a charging station, a data processing system or one or more processors. In brief overview, the method 500 can include receiving an indication at ACT 505. At ACT 510, the method 500 can include selecting a charging station. At ACT 515, the method 500 can include determining EV arrival time. At ACT 520, the method 500 can include determining the cooling time. At ACT 525, the method 500 can include providing an instruction.

Still referring to FIG. 5, among others, at ACT 505, the method 500 can include receiving an indication. The method can receive, by the one or more processors via a network, an indication of a location of the electric vehicle. The one or more processors can receive, via a network, an indication from the electric vehicle to establish a session to charge the electric vehicle. The one or more processors can receive, via a sensor, an indication of a first value of the temperature of the component. The component can include a power cable or a cord, a power plug, power electronics unit or control box, or any electrical component of the charge station. The one or more processors can receive, via a sensor, an indication of an ambient temperature external to the charging station. The indication can include information about one or more temperature readings of one or more components of the charging station. The indication can include one or more temperature readings of the EV. The indication can include information about the location of the EV, speed of travel of the EV, traffic data corresponding to the area through which the EV is travelling to the charge station, state of charge of the battery of the EV, state of health of the EV battery, information about the EV, information about the EV driver, information about the account of the EV driver for paying the services for the EV charging. The indication can include information on the time at which EV is to arrive to the charge station, or the time that it is expected to take for the EV to arrive to the charge station.

At ACT 510, the method selects a charging station. The method can select, by the one or more processors, based on the location, the charging station from a plurality of charging station. The method can select the charging station based on the availability, quality, performance data or compatibility between the charging station and the EV. The charging station can be selected based on the temperature readings of one or more components of the EV. For example, the charging station can be selected because the one or more components of the charging station are cooler than other available charging stations. The charging station can be selected based on a determination that the amount of energy to cool the components of the charging station is lowest out of all available charging stations.

At ACT 515, the method identifies EV arrival time. The method can identify, by the one or more processors, a first time at which an electric vehicle arrives at a charging station to charge the electric vehicle. The method can identify the time of the EV arrival based on the indication identifying location of the EV and the location of the charging station. The method can identify the time of the EV arrival based on a determination of the distance between the EV and the charging station. The method can identify the tame of the EV arrival based on a navigation function determining an estimated time of arrival of the EV to the charging station based on the current traffic reports and the shortest route for the EV to take to the charging station.

At ACT 520, the method determines the cooling time. The method can determine, by the one or more processors, based at least in part on the first time and a temperature of a component of the charging station, a second time prior to arrival of the electric vehicle at the charging station at which to activate a cooling system of the charging station. The method can determine, responsive to the indication and based on a distance between the electric vehicle and the charging station, the first time at which the electric vehicle arrives at the charging station to begin the session. The one or more processors can compare a first value of temperature of a component of a charge station with a threshold established for the component. The one or more processors can determine, based at least in part on a comparison of the first value with the threshold, to activate the cooling system at the second time.

The one or more processors can determine, based at least in part on the first time of EV arrival, the temperature of the component, and the ambient temperature external to the charging station, to activate the cooling system at the second time. The one or more processors can access a model trained with machine learning and data comprising values of the temperature of the component, values of an ambient temperature external to the charging station, and metrics indicating performance of charging sessions of the charging station. The one or more processors can determine, via the model and based on the first time, the second time at which to activate the cooling system.

At ACT 525, the method provides instruction. The method can provide, by the one or more processors, an instruction to activate the cooling system at the second time to lower the temperature of the component of the charging station by the first time at which the electric vehicle arrives at the charging station to charge the electric vehicle. The one or more processors can establish, based on a distance between the selected charging station and the electric vehicle, a session to begin to charge the electric vehicle at the first time. The method can provide the instruction to cool a component of a charge station to a particular temperature level. The method can provide instruction to cool a first component of a charge station to a first temperature level or range and a second component of the charge station to a second temperature level or range. The method can provide the instruction in response to any one or more of: a make and model of the EV, state of the battery of the EV, a state of charge of the EV, an ambient temperature of the charge station, temperature of the EV battery, metrics of sessions of the charging station, temperature level of a component of the charging station and temperature of the water or fluid in the cooler or cooling system of the charging station.

Figure 6:
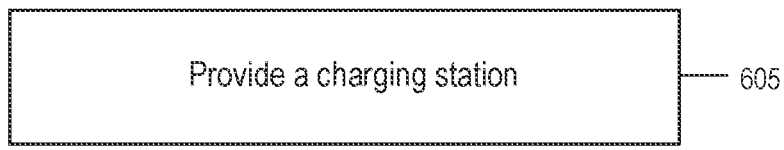
FIG. 6 is a flow diagram illustrating an example method for providing an EV charging station.

FIG. 6 illustrates an example method 600. The method 600 can include an ACT 605 of providing an electrical circuit of a charging station. The charging station can include or be electronically coupled to, directly or via a network, one or more processors coupled with memory. The charging station can identify, by the one or more processors coupled with memory, a first time at which an electric vehicle arrives at a charging station to charge the electric vehicle. The charging station can determine, by the one or more processors, based at least in part on the first time and a temperature of a component of the charging station, a second time prior to arrival of the electric vehicle at the charging station at which to activate a cooling system of the charging station. The charging station can provide, by the one or more processors, an instruction to activate the cooling system at the second time to lower the temperature of the component of the charging station by the first time at which the electric vehicle arrives at the charging station to charge the electric vehicle.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, a computer system 300 described in FIG. 3 can be used in conjunction with, instead of, or together with systems 400 or 500 or their system components, and vice versa. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
one or more processors, coupled with memory, to:
identify a first time at which an electric vehicle arrives at a charging station to charge the electric vehicle;
determine, based at least in part on the first time and a temperature of a component of the charging station, a second time prior to arrival of the electric vehicle at the charging station at which to activate a cooling system of the charging station; and
provide an instruction to activate the cooling system at the second time to lower the temperature of the component of the charging station by the first time at which the electric vehicle arrives at the charging station to charge the electric vehicle.

2. The system of claim 1, comprising the one or more processors to:
receive, via a network, an indication from the electric vehicle to establish a session to charge the electric vehicle; and
determine, responsive to the indication and based on a distance between the electric vehicle and the charging station, the first time at which the electric vehicle arrives at the charging station to begin the session.

3. The system of claim 1, comprising the one or more processors to:
receive, via a network, an indication of a location of the electric vehicle;
select, based on the location, the charging station from a plurality of charging station; and
establish, based on a distance between the selected charging station and the electric vehicle, a session to begin to charge the electric vehicle at the first time.

4. The system of claim 1, comprising the one or more processors to:
receive, via a sensor, an indication of a first value of the temperature of the component, the component comprising at least one of a power cable or power electronics;
compare the first value with a threshold established for the component; and
determine, based at least in part on a comparison of the first value with the threshold, to activate the cooling system at the second time.

5. The system of claim 1, comprising the one or more processors to:
receive, via a sensor, an indication of an ambient temperature external to the charging station; and
determine, based at least in part on the first time, the temperature of the component, and the ambient temperature external to the charging station, to activate the cooling system at the second time.

6. The system of claim 1, comprising the one or more processors to:
receive, from the electric vehicle via a network, an indication of a state of charge of a battery of the electric vehicle and a location of the electric vehicle;
select, based on the state of charge of the battery and the location of the electric vehicle, the charging station from a plurality of charging stations; and
predict, based on a distance between the selected charging station and the electric vehicle, the first time at which the electric vehicle arrives at the charging station.

7. The system of claim 1, comprising the one or more processors to:
receive, from the electric vehicle via a network, an indication of a state of charge of a battery of the electric vehicle;
determine, based on the state of charge, an amount of power to charge the battery of the electric vehicle; and
establish, based on the amount of power to charge the battery, to activate the cooling system at the second time.

8. The system of claim 7, comprising the one or more processors to:
receive a first value of the temperature of the component measured via a sensor;
determine, based on the amount of power to charge the battery, a second value of the temperature for the component less than the first value that increases a rate of charge of the charging station relative to the first value of the temperature; and
determine the second time at which to activate the cooling system based on the first value of the temperature, the second value of the temperature, and the first time of arrival.

9. The system of claim 8, comprising the one or more processors to:
establish a rate of cooling of the cooling system based on the first value of the temperature, the second value of the temperature, and the first time of arrival; and
provide the instruction to activate the cooling system to cool at the established rate of cooling.

10. The system of claim 1, comprising the one or more processors to:
instruct the charging station to present a notification at a third time that the charging station is reserved for the electric vehicle, the third time earlier than or equal to the second time at which the cooling system is instructed to activate.

11. The system of claim 1, comprising the one or more processors to:

identify, based at least on an indication of location of the electric vehicle input into a model trained via machine learning, the first time; and determine, based at least in part on the first time and the temperature of the component of the charging station input into the model, the second time.

12. The system of claim 1, the one or more processors to:

access a model trained with machine learning and data comprising values of the temperature of the component, values of an ambient temperature external to the charging station, and metrics indicating performance of charging sessions of the charging station; and determine, via the model and based on the first time, the second time at which to activate the cooling system.

13. The system of claim 12, comprising the one or more processors to:

identify an amount of power to charge the electric vehicle;

identify a first value of the temperature of the component measured by a sensor of the charging station;

identify an ambient temperature external to the charging station;

determine, via the model and based on the amount of power, a second value of the temperature of the component configured to improve performance of charging relative to the first value; and determine the second time at which to activate the cooling system and a rate of cooling of the cooling system via the model and based on the first time, the amount of power, the first value of the temperature of the component, the second value of the temperature of the component, and the ambient temperature.

14. A method, comprising:

identifying, by one or more processors coupled with memory, a first time at which an electric vehicle arrives at a charging station to charge the electric vehicle;

determining, by the one or more processors, based at least in part on the first time and a temperature of a component of the charging station, a second time prior to arrival of the electric vehicle at the charging station at which to activate a cooling system of the charging station; and providing, by the one or more processors, an instruction to activate the cooling system at the second time to lower the temperature of the component of the charging station by the first time at which the electric vehicle arrives at the charging station to charge the electric vehicle.

15. The method of claim 14, comprising:

receiving, by the one or more processors via a network, an indication from the electric vehicle to establish a session to charge the electric vehicle; and determining, by the one or more processors, responsive to the indication and based on a distance between the electric vehicle and the charging station, the first time at which the electric vehicle arrives at the charging station to begin the session.

16. The method of claim 14, comprising:

receiving, by the one or more processors via a network, an indication of a location of the electric vehicle;

selecting, by the one or more processors, based on the location, the charging station from a plurality of charging station; and establishing, by the one or more processors, based on a distance between the selected charging station and the electric vehicle, a session to begin to charge the electric vehicle at the first time.

17. The system of claim 14, comprising:

receiving, by the one or more processors via a sensor, an indication of a first value of the temperature of the component, the component comprising at least one of a power cable or power electronics;

comparing, by the one or more processors, the first value with a threshold established for the component; and determining, by the one or more processors, based at least in part on a comparison of the first value with the threshold, to activate the cooling system at the second time.

18. The method of claim 14, comprising:

receiving, by the one or more processors via a sensor, an indication of an ambient temperature external to the charging station; and determining, by the one or more processors, based at least in part on the first time, the temperature of the component, and the ambient temperature external to the charging station, to activate the cooling system at the second time.

19. The method of claim 14, comprising:

accessing, by the one or more processors, a model trained with machine learning and data comprising values of the temperature of the component, values of an ambient temperature external to the charging station, and metrics indicating performance of charging sessions of the charging station; and determining, by the one or more processors, via the model and based on the first time, the second time at which to activate the cooling system.

20. An electric vehicle charger comprising one or more processors, coupled with memory, to:

receive, via a network, an indication from an electric vehicle to establish a session to charge the electric vehicle, the indication comprising a state of charge of a battery of the electric vehicle and a location of the electric vehicle;

select, based on the state of charge of the battery and the location of the electric vehicle, a charging station from a plurality of charging stations;

determine, responsive to the indication and based on a distance between the electric vehicle and the charging station, a first time at which the electric vehicle arrives at the charging station to charge the electric vehicle in accordance with the session;

determine, based at least in part on the first time and a temperature of a component of the charging station, a second time prior to arrival of the electric vehicle at the charging station at which to activate a cooling system of the charging station; and provide an instruction to activate the cooling system at the second time to lower the temperature of the component of the charging station by the first time at which the electric vehicle arrives at the charging station to charge the electric vehicle.

* * * * *